United States Patent

[11] 3,632,136

[72] Inventor Ramon Doyle Foltz
South Euclid, Ohio
[21] Appl. No. 864,641
[22] Filed Oct. 8, 1969
[45] Patented Jan. 4, 1972
[73] Assignee Eaton Yale & Towne, Inc.
Cleveland, Ohio

[54] SAFETY APPARATUS
10 Claims, 4 Drawing Figs.

[52] U.S. Cl. .................................................. 280/150 AB
[51] Int. Cl. ...................................................... B60r 21/08
[50] Field of Search .......................................... 280/150 AB, 150 B

[56] References Cited
UNITED STATES PATENTS
3,506,281 4/1970 Berryman .................... 280/150 AB
FOREIGN PATENTS
953,312 3/1964 Great Britain ................ 280/150 AB Primary Examiner—Leo Friaglia
Assistant Examiner—John A. Pekar
Attorney—Yount and Tarolli ABSTRACT: An improved safety apparatus for protecting an occupant of a vehicle includes a pre-pressurized confinement which is expandable from a partially collapsed condition to an expanded condition under the influence of pressure applied to the confinement by a fluid medium contained within the confinement. A housing constrains the confinement in the partially collapsed condition against the influence of pressure applied to the confinement by the fluid medium. Upon the occurrence of an accident, a sensor detonates an explosive lock device to enable the housing to be opened by the confinement as it expands outwardly from the partially collapsed condition under the influence of the fluid medium within the confinement. A liner of sheet material advantageously encloses the confinement when it is in the partially collapsed condition to protect the confinement against obtrusions which may be located within the housing. An inert gas advantageously surrounds the confinement when it is in the partially collapsed condition to tend to minimize the effects of aging on the confinement.

PATENTED JAN 4 1972 3,632,136

INVENTOR
RAMON DOYLE FOLTZ
BY Yount and Tarolli
ATTORNEYS

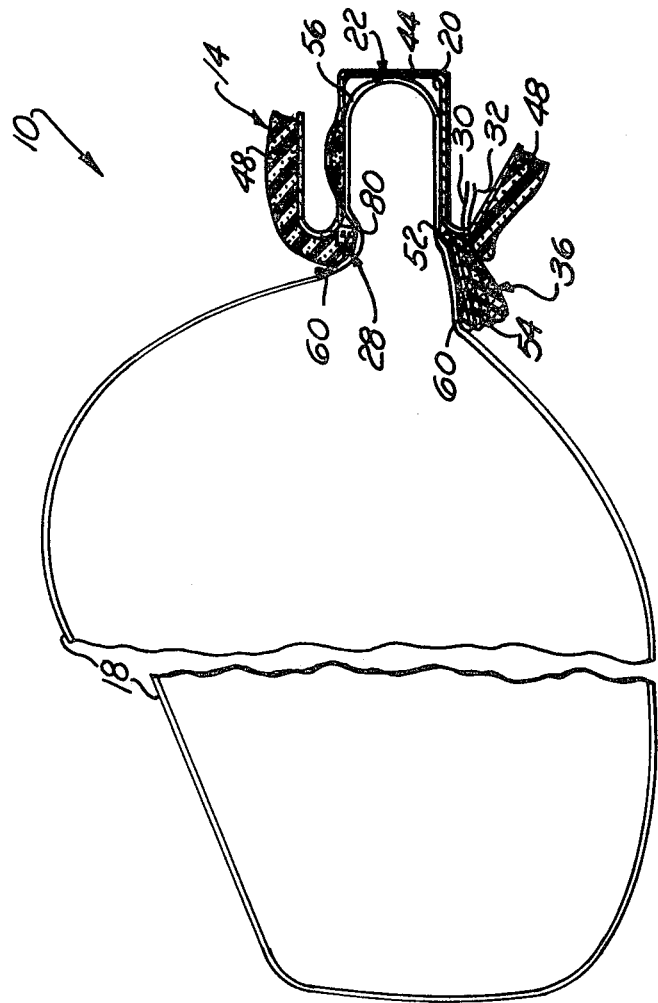
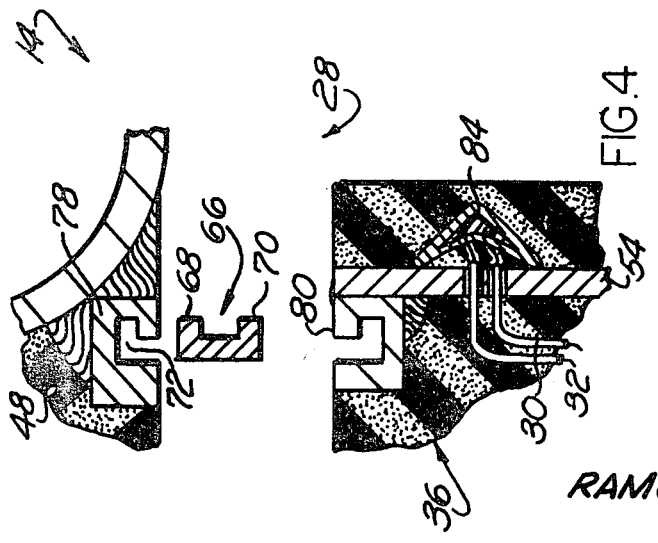

SAFETY APPARATUS

This invention relates generally to a safety apparatus which includes a confinement which is expanded to restrain movement of an occupant of a vehicle during an accident.

A known safety apparatus for protecting an occupant of a vehicle during an accident is disclosed in U.S. Pat. No. 3,414,292 to Oldberg et al. This safety apparatus includes a confinement which is expanded by a flow of fluid from a reservoir to restrain movement of the occupant of a vehicle upon the occurrence of an accident. To properly protect the occupant of the vehicle, fluid must flow at a high rate under substantial pressure from the reservoir into the confinement. Of course, problems are encountered in providing and directing fluid flow at high rates into a collapsed confinement to effect the rapid expansion of the confinement upon the occurrence of an accident.

Accordingly, it is an object of this invention to provide a new and improved safety apparatus which includes a pre-pressurized confinement which is expandable from a partially collapsed condition to an expanded condition under the influence of a fluid medium contained within the confinement upon the occurrence of an accident.

Another object of this invention is to provide a new and improved safety apparatus in accordance with the next preceding object wherein when the confinement is in the partially collapsed condition it is surrounded by an inert gas which tends to minimize the effect of the passage of time on the confinement.

Another object of this invention is to provide a new and improved safety apparatus including a confinement containing a fluid medium under pressure, a housing which holds the confinement in a partially collapsed condition against the influence of fluid pressure in the confinement, and an explosive means for opening the housing upon the occurrence of an accident to enable the confinement to be expanded by the fluid medium within the confinement to restrain movement of an occupant of the vehicle.

Another object of this invention is to provide a new and improved safety apparatus in accordance with the next preceding object wherein the safety apparatus further includes a sheet of material disposed between the confinement and the housing to protect the confinement when it is in the partially collapsed condition.

Another object of this invention is to provide a new and improved safety apparatus for protecting an occupant of a vehicle, including a confinement which is expandable to restrain movement of an occupant of a vehicle, a housing for enclosing the confinement, and explosive means for opening the housing upon the occurrence of an accident to enable the confinement to be expanded to restrain movement of the occupant of the vehicle.

These and other objects and features of the invention will become more apparent upon a consideration of the following description taken in connection with the accompanying drawings wherein.

Figure 2:
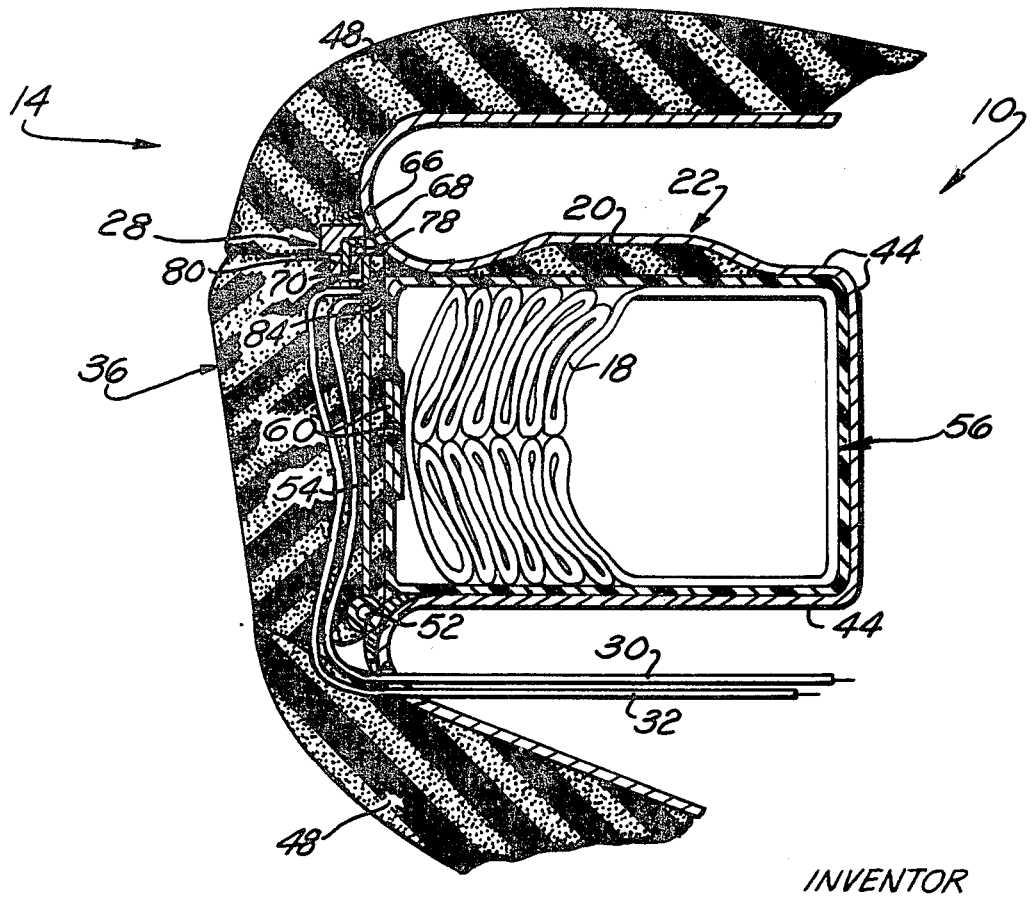
FIG. 2 is a schematic illustration, on an enlarged scale, of the safety apparatus of FIG. 1, the safety apparatus being shown in an initial or inactive condition.

FIG. 3 is a schematic illustration of the safety apparatus of FIG. 2 in an active condition in which a preinflated confinement is expanded to restrain movement of an occupant of the vehicle; and FIG. 4 is an enlarged, partially exploded, schematic illustration of an explosive lock device which is activated to open a housing which encloses the confinement when the safety apparatus is in the inactive condition of FIG. 2.

Figure 1:
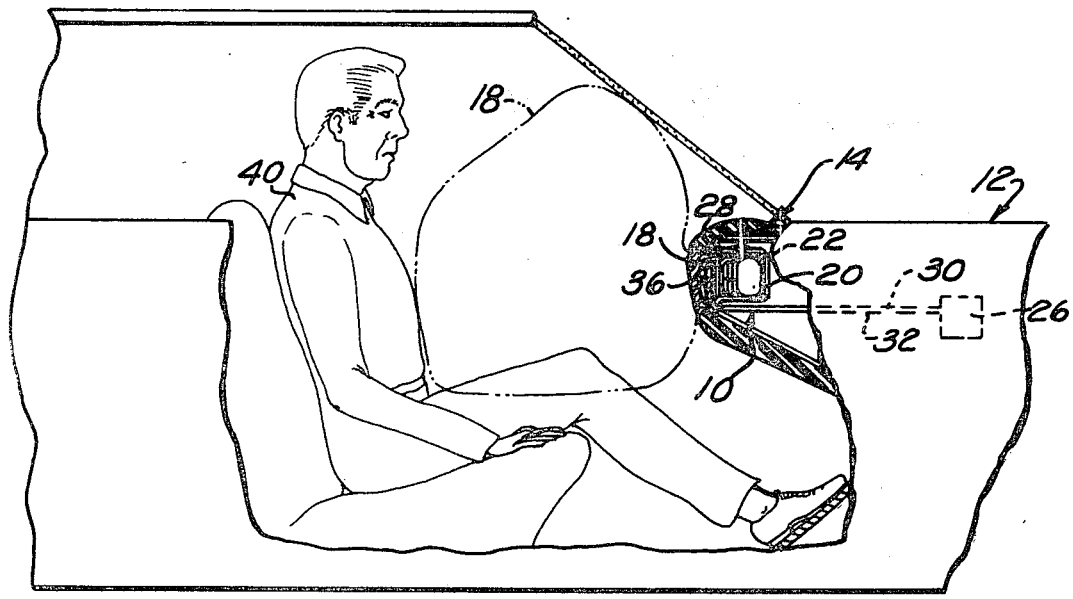
FIG. 1 is a schematic illustration of a vehicle having a safety apparatus constructed in accordance with the present invention.

Although a safety apparatus 10 constructed in accordance with the present invention can be utilized in many different types of vehicles, such as airplanes, tractors, trucks and boats, the safety apparatus is illustrated in FIG. 1 in association with an automotive vehicle 12. In the specific preferred embodiment of the invention illustrated in FIG. 1, the safety apparatus 10 is mounted on a dashboard 14 of the vehicle 12. However, it is contemplated that the safety apparatus could be mounted on other parts of the vehicle, such as a steering wheel, to protect occupants of the vehicle.

The safety apparatus 10 includes a pre-pressurized confinement 18 which forms a fluidtight envelope containing a gaseous fluid medium under pressure. The confinement 18 is held in a partially collapsed condition in a cavity or compartment 20 formed in the dashboard 14 by a suitable housing 22. Upon the occurrence of a collision, a known sensor assembly 26 (FIG. 1) completes an electrical circuit to activate an explosive lock device 28 through leads 30, 32. Activation of the explosive lock device 28 releases a door or panel 36 of the housing 22 for pivoting movement from the closed condition of FIG. 2 to the open condition of FIG. 3.

Immediately after activation of the explosive lock device 28, the door or panel 36 is pivoted from the closed position of FIG. 2 to the open position of FIG. 3 by outward pressure of the partially collapsed confinement 18 against the door 36. As the door pivots toward the open condition, the partially collapsed confinement 18 expands toward the expanded or operative condition illustrated in FIG. 3. When the confinement is in the expanded condition of FIG. 3, it is suitably deployed within the vehicle, as shown in dashed lines in FIG. 1, to restrain movement of the occupant 40 during the accident.

The confinement 18 is a fluidtight envelope which contains a gaseous fluid medium, such as nitrogen, under pressure. The pressure of the fluid medium in the confinement 18 is sufficient to expand the confinement to the operative condition of FIG. 3 while maintaining adequate pressure within the confinement. When the confinement is in the partially collapsed condition of FIG. 2, the volume of the fluid medium within the confinement is relatively small and, therefore, the pressure within the confinement is relatively high. The housing 22 encloses the partially collapsed confinement and constrains it against expansion to the expanded condition of FIG. 3 until the housing is opened by detonation of the explosive lock device 28 upon the occurrence of an accident. It should be noted that mass of the fluid medium within the confinement 18 stays constant upon expansion of the confinement from the partially collapsed condition of FIG. 2 to the expanded condition of FIG. 3, that is there is no fluid added to the confinement to effect this expansion. Therefore, the confinement can be rapidly expanded with a minimum of difficulty since the fluid for expanding the confinement is contained at all times within the confinement.

The housing 22 includes walls 44 which can be formed of metal or other suitable material having sufficient structural strength to withstand the outward pressure exerted by the confinement 18 when it is in the partially collapsed condition of FIG. 2. The walls 44 of the housing 22 are enclosed by a heavy layer of energy-absorbing foam or padding 48. This padding protects the occupant 40 during noncritical accidents in which expansion of the confinement is unnecessary. The housing 22 includes the panel or door 36 which is pivotally connected at 52 with the dashboard 14 and the walls 22 of the housing. The panel 36 is advantageously formed of a suitable energy-absorbing padding or foam. If necessary to provide sufficient structural strength, the panel 36 can be reinforced by a relatively thin layer 54 of metal or other material.

A liner 56 is advantageously provided between the confinement 18 and the wall 44 of the housing 22 to protect the confinement against static failure due to stress producing obtrusions which may be located within the compartment 20 formed by the housing 22. In a specific preferred embodiment the liner 56 takes the form of a sheet of polymeric material, such as "Teflon," and extends around the confinement 18. The liner 56 has overlapping ends or flaps 60 which are disposed in abutting engagement adjacent to the door 36. Of course, the relatively high fluid pressure within the confinement 18 presses the liner 56 outwardly against the walls 44 of the housing and the inner surface of the door or panel 36. Any space between the liner 56 and the confinement 18 is advantageously filled with an inert gas, such as nitrogen, to lessen the effect of the passage of time upon the confinement when it is in the partially collapsed condition of FIG. 2. Protection of the confinement by the liner 56 against protrusions in the cavity 20 and by inert gas is particularly important since the confinement 18 will be stored for a relatively long period of time with a high-pressure fluid medium in the confinement.

The explosive lock device 28 (FIG. 4) includes a latch bar 66 which extends longitudinally along the dashboard 14 and has legs 68 and 70 which engage recesses 72 and 74 formed by channel supports 78 and 80. A channel support 78 is fixedly mounted on the upper portion of the dashboard 14 while the channel support 80 is fixedly secured to the reinforcing panel 54 in the door 36. A linear, shaped explosive charge 84 is mounted adjacent to the channel 80 on the reinforcing panel 54 and is connected with the sensor 26 by the leads 30 and 32.

Upon the occurrence of an accident, the sensor 26 completes a circuit through the leads 30 and 32 to effect activation or detonation of the explosive charge 84. Detonating the explosive charge 84 severs the door 36, or at least the reinforcing panel 54, immediately below the channel section 80. Thus, the channel section 80, latch bar 66 and channel section 70 are severed from the door 36 to thereby reduce the weight and inertia of the door. This enables the door or panel 36 to be quickly pivoted from the closed position of FIG. 2 to the open position of FIG. 3 under the influence of the high-pressure fluid in the confinement 18. If the shaped charge fails to completely sever the foraminous padding around the panel 54, the charge will at least weaken the door sufficiently to enable the door to be forced open by the pre-pressurized confinement 18. Severing the components of the lock device 28 from the door 36 also tends to minimize the possibility of injury to the occupant 40 of a vehicle by engagement of the door 36 with the occupant.

Immediately after detonation of the charge 84 and severing of the upper end portion of the panel 36 from the channel 80, the high-pressure fluid in the confinement 18 presses the flaps 60 of the liner 56 outwardly against the door to pivot the door about the hinge 52. As this outward pivoting movement of the door continues, the flaps 60 on the liner are moved or laid over the channel section 80 and hinge 52 by the confinement 18 as it expands outwardly toward the operative condition illustrated in FIG. 3. In this manner, the flaps 60 of the liner 56 protect the confinement 18 against damage as it is being expanded through the opening formed by outward pivoting movement of the door or panel 36.

In view of the foregoing remarks, it is apparent that the safety apparatus 10 includes a preinflated confinement 18 which is expanded from a partially collapsed condition to an expanded condition, upon the occurrence of an accident, under the influence of a fluid medium which is contained within the confinement. This eliminates the necessity of providing a source of fluid and quickly flowing fluid from the source to expand the confinement. Upon the occurrence of an accident, the explosive lock device 28 is activated to release the door or panel 36. Thereupon, the high-pressure fluid medium which is within the confinement 18 causes the confinement to effect an outward pivoting movement of the door 36 to the open position of FIG. 3. The confinement is then free to expand, under the influence of the fluid medium contained within the confinement, to the expanded condition in which it is adapted to restrain movement of an occupant of a vehicle during the accident.

Having described a specific preferred embodiment of the invention, the following is claimed:

1. Safety apparatus for use in a vehicle to protect an occupant of the vehicle during a collision, said apparatus comprising a pre-pressurized confinement defining an envelope containing a fluid medium under pressure, said confinement being expandable under the influence of the fluid medium within said confinement from a partially collapsed condition to an expanded condition to restrain movement of an occupant of the vehicle, housing means for holding said preinflated confinement in the partially collapsed condition, said housing means being operable from a closed condition holding said confinement in the partially collapsed condition to an open condition in which said confinement is free to expand to the expanded condition under the influence of the fluid medium within said confinement, liner means between said confinement and interior surfaces of said housing means for protecting said confinement, said liner means including overlapping flap portions which are moved outwardly by said confinement upon initiation of expansion of said confinement to the expanded condition to thereby at least partially protect said confinement as it is expanded, and sensor means for detecting the occurrence of a collision and initiating expansion of said confinement from said partially collapsed condition to the expanded condition in response to the occurrence of a collision.

2. Safety apparatus as set forth in claim 1 further including inert gas means within said housing means when said housing means is in said closed condition to tend to minimize the effects of the passage of time on said confinement while said confinement is in said partially collapsed condition.

3. Safety apparatus as set forth in claim 1 wherein said housing means includes a panel movable from a first position to a second position to effect operation of said housing means from said closed condition to said open condition and explosive lock means for retaining said panel in said first position, said sensor means being operatively connected with said explosive lock means and being operable to effect detonation of said explosive lock means upon the occurrence of an accident to thereby free said panel for movement from said first position to said second position under the influence of said confinement.

4. Safety apparatus as set forth in claim 3, wherein said movable panel comprises an energy-absorbing material.

5. Safety apparatus for protecting an occupant of a vehicle during a collision, said safety apparatus comprising a pre-pressurized confinement expandable from an initial condition to an expanded condition to restrain an occupant of the vehicle during a collision, housing means for containing said pre-pressurized confinement in the initial condition, said housing means including an energy absorbing, movable section and releasable locking means for normally maintaining said pre-pressurized confinement in said initial condition and movable upon release of said locking means to a position enabling expansion of said pre-pressurized confinement to the expanded condition.

6. Safety apparatus as set forth in claim 5 wherein said releasable locking means includes a fastener means normally preventing movement of said energy absorbing, movable section and explosive means associated with said fastener means for releasing said energy absorbing, movable section upon occurrence of a collision.

7. Safety apparatus as set forth in claim 6, including sensing means for detecting the occurrence of a collision and effecting activation of said explosive means to release said fastener means and permit expansion of said confinement from said initial condition to said expanded condition.

8. Safety apparatus as set forth in claim 6 wherein said confinement in said initial condition is partially expanded by a fluid medium under pressure within said confinement and is constrained against expansion to said expanded condition by said housing means, said confinement being released for expansion to said expanded condition under the influence of said fluid medium upon activation of said explosive means in response to said sensor means detecting the occurrence of a collision and effecting activation of said explosive means.

9. Safety apparatus as set forth in claim 6 further including a layer of sheet material surrounding said confinement and disposed between said confinement and said housing means when said confinement is in the initial condition to thereby protect said confinement.

10. Safety apparatus as set forth in claim 6 further including an inert fluid medium in said housing means and engaging an outer surface area of said confinement to tend to minimize the effect of the passage of time on said confinement when said confinement is in the initial condition.

* * * * *